(12) United States Patent
Mahy

(10) Patent No.: US 7,616,345 B2
(45) Date of Patent: Nov. 10, 2009

(54) METHOD FOR TRANSFORMING A DIGITAL IMAGE FROM A FIRST TO A SECOND COLORANT SPACE

(75) Inventor: Marc Mahy, Wilsele (BE)

(73) Assignee: Agfa Graphics NV, Mortsel (BE)

( * ) Notice: Subject to any disclaimer, the term of this patent is extended or adjusted under 35 U.S.C. 154(b) by 846 days.

(21) Appl. No.: 10/718,148

(22) Filed: Nov. 20, 2003

(65) Prior Publication Data

US 2004/0150847 A1 Aug. 5, 2004

Related U.S. Application Data

(60) Provisional application No. 60/428,372, filed on Nov. 22, 2002.

(30) Foreign Application Priority Data

Nov. 22, 2002 (EP) ................. 02102625.7

(51) Int. Cl.
*H04N 1/40* (2006.01)
(52) U.S. Cl. ........................ 358/2.1; 382/162
(58) Field of Classification Search .......... 358/1.9, 358/2.1, 500, 504, 518, 523, 530, 536, 1.16; 382/162, 166–167
See application file for complete search history.

(56) References Cited

U.S. PATENT DOCUMENTS 6,269,184 B1 * 7/2001 Spaulding et al. ........... 382/167
6,775,030 B2 * 8/2004 Krabbenhoft et al. ........ 358/1.9
6,870,636 B2 * 3/2005 Kulkarni ..................... 358/1.9
7,088,479 B2 * 8/2006 Fujita ......................... 358/536
2001/0024302 A1 * 9/2001 Fujita ......................... 358/536
2002/0131063 A1 * 9/2002 Krabbenhoft et al. ........ 358/1.9

FOREIGN PATENT DOCUMENTS

EP  A-1083739  3/2001

OTHER PUBLICATIONS

Stone, M.C. et al, "Gamut Mapping Computer Generated Imagery", Graphics Interface '91, XP000576926, pp. 32-39.
Stone, M.C. et al, "Color Gamut Mapping and the Printing of Digital Color Images", (1988), XP000600596, pp. 249-292.

* cited by examiner

*Primary Examiner*—Thomas D Lee
*Assistant Examiner*—Stephen M Brinich
(74) *Attorney, Agent, or Firm*—Keating & Bennett, LLP

(57) ABSTRACT

A method for obtaining a first representation of a digital image by means of a first output device and a second representation of the digital image by means of a second output device, wherein the first output device has a first, device dependent, colorant space and the second output device has a second, device dependent, colorant space, the method including (a) determining a transformation for transforming a set of colorant values of a pixel of the digital image from the first to the second colorant space; (b) selecting a particular set of colorant values in the first colorant space; and (c) modifying the transformation for the particular set of colorant values.

12 Claims, 2 Drawing Sheets

METHOD FOR TRANSFORMING A DIGITAL IMAGE FROM A FIRST TO A SECOND COLORANT SPACE

The application claims the benefit of U.S. Provisional Application No. 60/428,372 filed on Nov. 22, 2002.

FIELD OF THE INVENTION

The invention relates to the field of color management, and in particular to the transformation of colorant values of a digital image from a colorant space to another one.

BACKGROUND OF THE INVENTION

In the graphic arts industry, before a color image is printed, very often a proof of the image is made. The proof is used for inspection and approval by the printer or his customer before printing the color image on the production printing press. Nowadays, such a proof is usually made by means of digital color proofing, wherein digital data that represent the color image are directly sent to a high resolution, high-quality printer that prints the color proof on a receiving substrate, such as paper. High-quality ink-jet printers may be used for this purpose. In this document, the printer on which the proof will be made is called the proofing device, or simply the proofer, while the printer on which the image is finally to be printed is called the printing device.

The color image that is to be printed can be represented as a digital image, by a number of pixels, i.e. small discrete elements that together constitute the digital image. Each pixel has a set of color values in a device independent color space, such as CIELAB.

If the color image is to be printed on a particular printing device, the characteristics of that printing device have to be taken into account. Each printing device has a device dependent colorant space; for a printing device that uses cyan (C), magenta (M), yellow (Y) and black (K) marking particles (i.e. particles such as ink or toner), the device dependent colorant space is a CMYK space. A "colorant" is an independent variable with which a printing device can be addressed; in case of a CMYK printer, the colorants are C, M, Y and K. It is customary to express the range of physically achievable values for the colorants of a device in %. Therefore, the so-called "colorant values", denoted as c, usually range from c=0% to c=100%.

Different printing devices have different characteristics, e.g. the two cyan inks used by two different printers will usually have different colors (the color difference may be small but such small differences may be very significant in high-quality printing). The printer model of a particular printing device reflects how that particular device reproduces color. A "printer model" is a mathematical relation that expresses the printer's output color values as a function of the input colorant values for a given printer. Thus, when inputting a set of colorant values to the printer model, the output of the printer model is the set of color values that will result when the printer is addressed with that set of colorant values. The printer model can be inverted; when using the inverted printer model, the colorant values result that are required to obtain given color values with the particular printer.

For a CMYK printing device, the "primary colors" are cyan, magenta, yellow and black. The "secondary colors" for a CMYK device are red (R), green (G) and blue (B); they are obtained by combining two primary colors (R=M+Y, G=C+Y, B=C+M). For an RGB device, red, green and blue are the primary colors while cyan, magenta and yellow are the secondary colors.

More information on colorants, colorant space, color space, gamuts, printer model and other relevant terms can be found in EP-A-1 083 739 herein incorporated by reference in its entirety for background information.

To make a digital color proof on a proofer of a color image that is to be printed on a specific printing device, it is customary to proceed as follows.

In a first step, a transformation from the specific printing device to the proofer is determined, so that the transformation has as input data colorant values in the device dependent colorant space of the specific printing device, and as output data colorant values in the device dependent colorant space of the proofer. This transformation is composed of the printer model of the specific printing device followed by the inverted printer model of the proofer. Then, in a second step, the transformation that was determined in the first step is applied to the color image, pixel per pixel (remark: the input data for the transformation can e.g. be obtained by transforming the color values of the image in CIELAB space to the CMYK space of the specific printing device). By applying the transformation, the input data in the device dependent colorant space of the specific printing device are thus transformed initially to a device independent color space, by means of the printer model of the specific printing device, and subsequently from this device independent color space to the device dependent colorant space of the proofer, by means of the inverted printer model of the proofer. The obtained output data, in the device dependent colorant space of the proofer, can now be used to address the proofer in order to make the proof of the color image.

By starting from input data in the device dependent colorant space of the printing device, and transforming them to the proofer, a faithful proof of the image is obtained, since the transformation suitably takes account of the characteristics of the printing device and of the proofer.

However, the resulting proof is often not satisfactory. A typical example are color strips of primary and secondary colors that are printed in the border of the receiving substrate as control patches. E.g. in the yellow patch, some spots of other colors may appear that are disturbing to the customer.

There is thus a need for improving the transformation method described above.

SUMMARY

The present invention is a method for transforming a digital image from a first to a second device dependent colorant space as claimed in independent claims 1 and 16. Preferred embodiments of the invention are set out in the dependent claims. Preferably, a method in accordance with the invention is implemented by a computer program product as claimed in independent claims 22 and 25. The invention also includes a data processing system that is suitable for carrying out a method in accordance with the invention, and a computer readable medium comprising program code adapted to carry out a method according to the invention when the program code is run on a computer.

In a method in accordance with the invention, a transformation is determined from a first output device to a second output device, so that the transformation has as input data colorant values in the device dependent colorant space of the first output device, and as output data colorant values in the device dependent colorant space of the second output device. The transformation from the first to the second output device is preferably modified for at least one set of input colorant values. Both the first and the second output device may be used to obtain representations of a digital image.

An advantage of a method in accordance with the invention is that it allows to obtain pure colors, without undesired spots of other colors or an undesired color cast, on both the first and the second output device. This is especially useful for primary and secondary colors.

The modification of the transformation for at least one set of colorant values, mentioned above, can be performed either automatically or based on information obtained from a user; the latter alternative is preferred.

Advantageously, for the modification of the transformation, data are used of a modified color separation of a specific color in the first colorant space into one or more colors in the second colorant space. In case the modification is based on information obtained from a user, this information may comprise the data of the modification of the color separation.

In a specific embodiment of the invention, the first output device is a printing device and the second output device is a proofing device. The method of the invention may also be applied to other output devices; both the first and the second output device may be monitors, or the first output device may be a monitor and the second output device an ink-jet proofing device, etc. In the case of a monitor, the device dependent colorant space is preferably an RGB space.

Further advantages and embodiments of the present invention will become apparent from the following description and drawings.

BRIEF DESCRIPTION OF THE DRAWINGS

The invention is described with reference to the following drawings without the intention to limit the invention thereto, and in which.

DETAILED DESCRIPTION OF THE PREFERRED EMBODIMENTS

Figure 1:
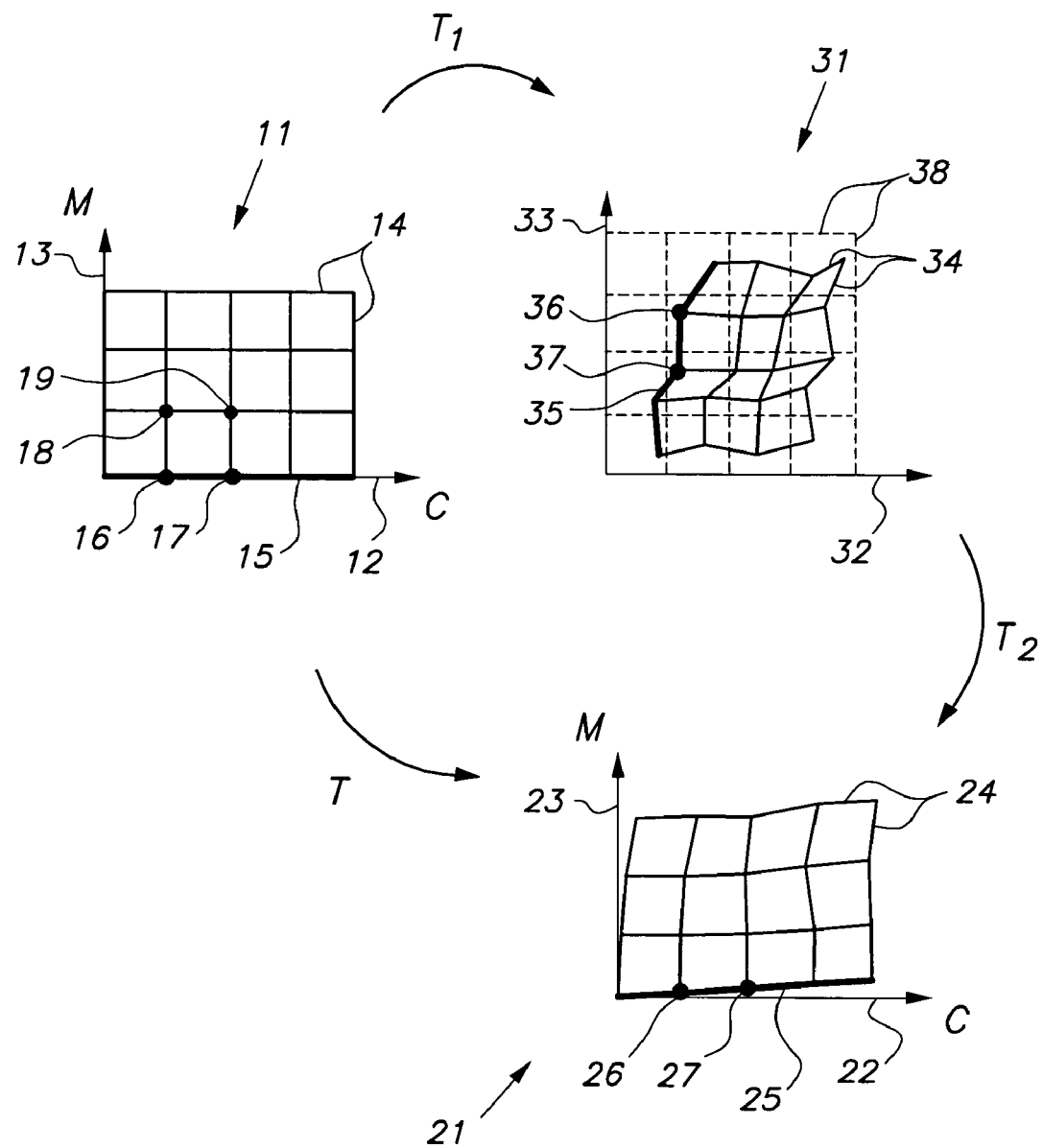
FIG. 1 shows a transformation from a first to a second device dependent colorant space.

FIG. 1 shows a transformation T from a first, device dependent, colorant space 11 to a second, device dependent, colorant space 21. For simplicity, the transformation T is illustrated by means of two-dimensional CM (cyan magenta) colorant spaces 11, 21. In practice, colorant spaces are usually more-dimensional; the colorant space will e.g. be a four-dimensional CMYK space for a CMYK device.

As shown in FIG. 1, a set of curves 14 on a grid in the first colorant space 11 are transformed by transformation T into a set of curves 24 in the second colorant space 21. Analogously, curve 15 out of the set of curves 14 is transformed into curve 25 and points 16 and 17 on curve 15 are transformed into respectively point 26 and point 27. In FIG. 1, the set of curves 14 are on a grid that is aligned with the axes 12, 13 of the first colorant space 11. After the transformation T, the transformed set of curves 24 are no longer on such a grid aligned with the axes 22, 23 of the second colorant space 21. Point 16 on axis 12, which has e.g. colorant values $(c_C, c_M)=(20, 0)$, is thus transformed into point 26 which has e.g. colorant values $(c_C, c_M)=(19, 2)$, i.e. a pure cyan point 16 is transformed into a point 26 that has a magenta component. If such a component is not desired, the transformation T can be modified for point 16, i.e. for the colorant values $(c_C, c_M)=(20, 0)$. A modification of transformation T may include determining and modifying a color separation, as follows.

Figure 2:
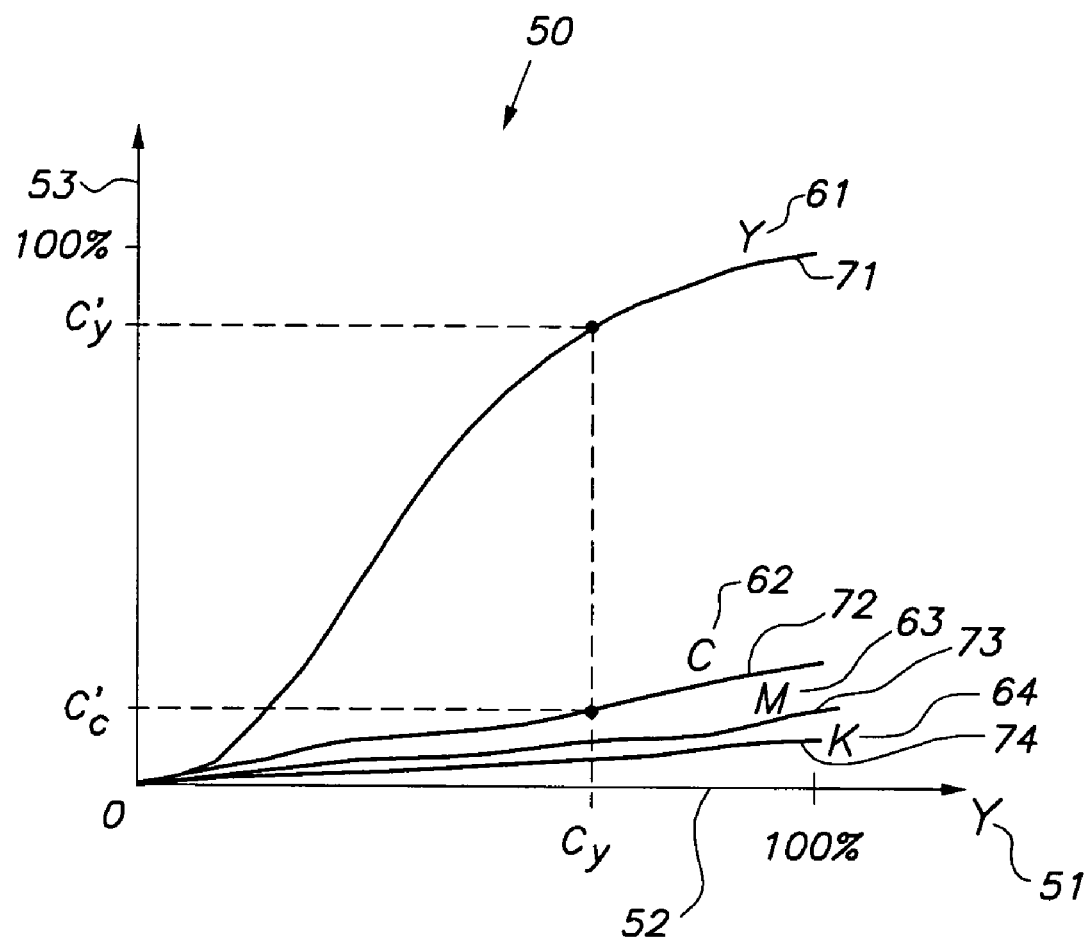
FIG. 2 shows a color separation of a specific color in a first colorant space into colors in a second colorant space.

FIG. 2 shows a color separation 50 of a specific color 51 in the first colorant space 11 that is separated into one or more colors 61-64 in the second colorant space 21; these one or more colors 61-64 are preferably selected from the group of primary and secondary colors in the second colorant space, more preferably from the group of primary colors in the second colorant space. In FIG. 2, the first colorant space 11 is a CMYK space and the specific color 51 is a primary color, Y, in this space 11. The second colorant space 21 is also a CMYK space, and the specific color 51, yellow, is separated into the primary colors 61-64 in this second colorant space 21, i.e. Y, C, M and K. The curves 71-74 show how the specific color 51, yellow, is separated, e.g. 60% yellow, indicated by the colorant value $C_Y$ on axis 52 (i.e. $C_Y=60$, $c_C=c_M=c_K=0$) is separated into amounts of Y, C, M and K that correspond to the colorant values $c'_Y$, $c'_C$, $c'_M$ and $c'_K$ on axis 53; only $c'_Y$ and $c'_C$ are indicated in FIG. 2 in order to keep the drawing readable. Axis 52 is thus used to indicate the colorant values of the specific color 51 in the first colorant space 11, while axis 53 is used for the colorant values in the second colorant space 21.

The color separation 50 can be determined from the transformation T from the first colorant space 11 to the second colorant space 21. In fact, the curves 71-74 indicate how a specific color 51, yellow, in the first colorant space 11 is transformed to the second colorant space 21 (e.g. $(c_Y, c_C, c_M, c_K)=(60, 0, 0, 0)$ is transformed to $(c'_Y, c'_C, c'_M, c'_K)$, so that the data for these curves 71-74 can be obtained from the transformation T.

The color separation 50 can be modified. If e.g. in FIG. 2 one or more of the non-yellow components, indicated by the curves 72-74 for respectively C, M and K, are not desired, these curves may be modified. E.g. curve 72 for C may be replaced by another curve, such as a curve coinciding with axis 52, so that after this modification yellow will no longer have a cyan component in the second colorant space 21. The curves 73 for the magenta component and 74 for the black component may also be modified. It is preferred that the modified color separation 50 is used to modify the transformation T from the first colorant space 11 to the second colorant space 21, so that the modified transformation gives as output data the modified colorant values, e.g. $(c_Y, c_C, c_M, c_K)=(60, 0, 0, 0)$ is transformed to $(c'_Y, 0, 0, 0)$.

Color separations may be determined and modified for any color; this is especially useful for primary and also for secondary colors in the first colorant space 11, since these colors are often used in control patches, as mentioned above.

In a preferred embodiment of the invention, the information on the modification of a color separation 50 is obtained from a user. This may be done as follows. The color separation 50 is shown to the user on a computer display. The user now interactively changes one or more curves 71-74, e.g. he drags a curve on the display so that it gets another shape, or he clicks on a curve, gets the colorant values associated with the curve, and changes them.

In a specific embodiment, the transformation T from the first colorant space 11 to the second colorant space 21 is modified in such a way that, for at least one set of colorant values, the value of a particular "psychophysical quantity" or "psychovisual quantity" (such as CIE lightness L* or CIE chroma C*) is retained, wherein a psychophysical and a psychovisual quantity are as defined in EP-A-1 083 739, cited already above. An example of retaining such a value is as follows. When, as discussed above in connection with FIG. 2, the color separation 50 is modified so that undesired color components are eliminated from yellow and e.g. $(c_Y, c_C, c_M, c_K)=(60, 0, 0, 0)$ is transformed to $(c'_Y, 0, 0, 0)$, the colorant value $c'_Y$ is adjusted to a value $c''_Y$ in order to retain the lightness value, CIE L*. This means that $c''_Y$ is calculated so that (c"$_Y$, 0, 0, 0) has the same L* value as (c'$_Y$, c'$_C$, c'$_M$, c'$_K$) (into which (c$_Y$, c$_C$, c$_M$, c$_K$)=(60, 0, 0, 0) was transformed originally, before the modification of the color separation 50). An advantage of this adjustment is the visually correct reproduction of color gradations (such as a yellow wedge consisting of patches printed for c=10%, c=20%, c=30%, etc.), especially in the highlights.

Such an adjustment may be implemented by a computer program module, that performs the required calculations.

In general, a user may select at least one set of colorant values and modify the transformation T for that set, after which the transformation is further modified automatically, preferably in order to retain a particular quantity, which may be a psychophysical or a psychovisual quantity. The transformation is then preferably modified for the selected set of colorant values and for other sets of colorant values as well. Other, less preferred methods for modifying the transformation are as follows. The way in which the transformation is to be modified is determined completely by the user. Alternatively, the transformation T is modified automatically for a particular set of colorant values (e.g. so that "yellow remains yellow").

Instead of adjusting the colorant value c'$_Y$ to a value c"$_Y$ in order to retain the value of CIE L*, a value of another quantity may be retained. The transformation T from the first colorant space 11 to the second colorant space 21 may also be modified in such a way that a particular condition is satisfied, e.g. curve 71 in FIG. 2 may be adjusted to conform to a predefined curve, such as a given tone curve.

FIG. 1 shows that the transformation T from the first colorant space 11 to the second colorant space 21 may be performed via an intermediate, device independent, color space 31. Preferably, the device independent color space 31 is CIELAB or CIE XYZ. As shown in FIG. 1, the set of curves 14, curve 15 and points 16 and 17 in the first colorant space 11 are transformed by a first transformation T$_1$ to respectively the set of curves 34, curve 35 and points 36 and 37 in color space 31. These objects 34-37 in color space 31 are subsequently transformed by a second transformation T$_2$ to respectively the set of curves 24, curve 25 and points 26 and 27 in the second colorant space 21.

In FIG. 1, the set of curves 14 are on a grid in the first colorant space 11, and points 16-19 are grid points, i.e. points at the intersection of grid lines (remark: to keep the drawing readable, only four grid points 16-19 are indicated by reference signs in FIG. 1). In general, grid points do not remain grid points after transformation. This is illustrated in FIG. 1, where the set of curves 14 on a grid in colorant space 11 are transformed by T$_1$ to the set of curves 34 that are not on a grid 38 aligned with the axes 32, 33 of the color space 31. Analogously, grid points 16-19 in colorant space 11 are not transformed to grid points in color space 31 (in FIG. 1, only the transformation of points 16 and 17 is shown, i.e. points 36 and 37, not lying on grid 38).

It is customary to implement the transformations T$_1$ and T$_2$ as tables supplemented with interpolation techniques. Such a table contains data for a large number of input and output points. The input points are grid points obtained by sampling along the coordinate axes, usually from 0% to 100% with a given increment; when e.g. points are sampled every 20% in CMYK space, there are 6$^4$=1296 input points, namely all combinations obtained by giving to c$_C$, c$_M$, c$_Y$ and c$_K$ the values 0, 20%, 40%, 60%, 80 and 100%. The table contains for each input point the corresponding output point, i.e. the point obtained by applying the transformation to the input point; as an example for a transformation from CMYK space to CIELAB space, the table will contain [(0, 0, 0, 100), (14, 1.5, 1)] if the input point with colorant values c$_C$=0, c$_M$=0, c$_Y$=0 and c$_K$=100% is transformed to the output point having the color values L*=14, a*=1.5 and b*=1.

For an input point that is not a grid point, the corresponding output point is determined by applying interpolation techniques to the data in the table. Thus (see FIG. 1) interpolation is applied to transform point 36 by T$_2$; the resulting output is point 26. For the transformation of point 37 into point 27 by T$_2$, interpolation is applied too. In FIG. 1, points 36 and 37 are located in different squares of grid 38, so that they have different sets of neighboring grid points. Usually, these neighboring grid points are used in the interpolation, resulting in different interpolation functions being used in transforming point 36 to point 26 on the one hand and point 37 to point 27 on the other hand. That different interpolation functions are used has repercussions on the color difference between points 26 and 27.

The case of points 36 and 37 above is just an example of a more general observation: when transforming input points 16 and 17 in a first colorant space 11 to output points 26 respectively 27 in a second colorant space 21, via an intermediate color space 31, the effect on the output data of a change in the input data cannot be controlled properly. This is especially due to the sampling of grid points in the intermediate color space 31.

This problem also occurs when using ICC profiles. An ICC profile is a profile (a file of data) that contains pairs of corresponding color values and colorant values for a device and that meets a particular standard, the ICC standard; ICC stands for International Color Consortium. An ICC profile for a printer contains a table from CMYK space to CIELAB space, which is called in this document the "forward table", and a table from CIELAB space to CMYK space, called the "inverse table". To make a digital color proof on a proofer of a color image that is to be printed on a specific printing device by making use of ICC profiles, a profile sequence is made that contains the forward table of the specific printing device followed by the inverse table of the proofer. The tables of the profile sequence may be concatenated into a single table, which is called the "link" in this document and which is an implementation of the transformation T in FIG. 1. When this link is applied to input data of the color image in the CMYK space of the printing device, output colorant values in the CMYK space of the proofer are obtained.

Data defining a modification of this link can be obtained as described above. In one embodiment of the invention, from a user, desired modifications are obtained that preferably relate to at least one primary color and more preferably to all primary colors; still more preferably, the desired modifications also relate to at least one and most preferably to all secondary colors.

The modified link (which is preferably a new table, obtained by applying the modifications to the original link table) may then be used to represent images, pixel per pixel.

In a particular embodiment of the invention, there are thus three phases: obtaining the desired modifications from a user; using these modifications to draw up a table from the first to the second colorant space; and applying the table to an image. As discussed already above, the modifications desired by the user may relate to one or more sets of colorant values, selected by the user, after which the transformation is further modified automatically.

The data defining the modification of the link may be stored, e.g. in the link itself, or in the first profile of the profile sequence, or in the second profile of the profile sequence, or still in another way.

In a specific embodiment, modification data are stored per rendering intent. A "rendering intent" is an approach to rendering color from one color or colorant space to another one (see also: "The Secrets of Color Management", Agfa-Gevaert, 1997, ND7VS GB00 199705). Within the ICC framework, four rendering intents are defined, but only three different forward or reverse tables can be found in the profile. This can be explained by the fact that one table is used twice, once for the relative calorimetric rendering intent and once for the absolute calorimetric rendering intent. By defining separate modification values, both rendering intents are treated independently.

The invention is also applicable to a profile sequence containing three or more profiles, or, in general, to a transformation T that is made up from three or more constituent transformations. In such a case, the invention may be applied per pair of two successive constituent transformations or profiles. An example of a transformation made up from more than two constituent transformations is a transformation from SWOP (which is a standard CMYK space) to EURO (another standard CMYK space) and subsequently to a proofer CMYK space of a specific proofing device.

An advantage of the invention is that it allows proper control of the effect on the output data of a change in the input data, by modifying the transformation T where this is required.

Preferably, the modification is carried out after the determination of the transformation T, e.g., when profiles are used, after concatenating the profiles of the profile sequence into the link.

Another advantage of the invention is that, in addition to obtaining pure colors, e.g. "yellow remains yellow", one or more color characteristics can be retained (see the example of retaining CIE L* for yellow, discussed further above).

The invention may also be applied to retain a specific color cast of an image, e.g. in order to make a high quality and faithful reproduction, on a printer, of an image represented on a monitor and exhibiting that specific color cast due to the characteristics of the monitor.

Another example is related to gray images or gray portions of images. To obtain a high quality color reproduction, which is in this case a gray without color cast, a color separation of the image or image portion is made in such a way that the black component, K, is maximal. The transformation T is then modified so that any non-zero C-, M- and Y-components are made zero.

In a method in accordance with the invention, the transformation T from the first colorant space 11 to the second colorant space 21 may either be performed directly, in one step, or via one or more intermediate spaces, i.e. in two or more steps. With respect to the use of profiles, this means that either the link or the separate profiles may be used.

As mentioned above, the transformation T from the first colorant space 11 to the second colorant space 21 may be modified by using data of a modified color separation 50. Modifying the transformation T can also be done in other ways. E.g., for one or more input points, the user can simply determine, point per point, into which output point each input point will be transformed. In another embodiment, the modification is performed in two steps. In a first step, the transformation T is modified for one or more points in a first subspace of the first colorant space 11; preferably this first subspace includes one or more primary colors, more preferably also one or more secondary colors of the first colorant space 11. In a second step, the transformation T is also modified for one or more points in an additional subspace of the first colorant space 11 that is adjacent to the first subspace. This additional subspace may provide a very smooth transition between the colorant values that result from the modified transformation and those that result from the unmodified transformation.

The invention also includes a method wherein a first and a second subspace are determined in a colorant space 11, wherein a particular transformation is determined for the first subspace and wherein another transformation, different from the particular transformation, is determined for the second subspace. The first subspace may comprise the primary colors of the colorant space 11. It may also comprise the secondary colors of the colorant space 11.

Those skilled in the art will appreciate that numerous modifications and variations may be made to the embodiments disclosed above without departing from the scope of the present invention.

LIST OF REFERENCE SIGNS

11: colorant space
12: axis
13: axis
14: set of curves
15: curve
16: point
17: point
18: point
19: point
21: colorant space
22: axis
23: axis
24: set of curves
25: curve
26: point
31: color space
32: axis
33: axis
34: set of curves
35: curve
36: point
38: grid
50: color separation
51: specific color
52: axis
53: axis
61-64: color
71-74: curve
T: transformation
$T_1$: transformation
$T_2$: transformation

The invention claimed is:

1. A method for modifying a transformation T that transforms first colorants in a first device dependent colorant space into second colorants in a second device dependent colorant space, the method comprising the steps of:
   selecting at least one set of colorants in said first device dependent colorant space;
   transforming said set of colorants from said first device dependent colorant space to said second device dependent colorant space using said transformation T to obtain a set of transformed colorants;
   having at least one of the transformed set of colorants modified by a user; and
   automatically adjusting the transformation T so that a modified colorant set retains at least psychovisual or psychophysical quantity related to the set of transformed colorants.

2. The method according to claim 1, wherein the step of having at least one of the transformed set of colorants modified by a user includes eliminating at least one undesired colorant from the transformed set of colorants.

3. The method according to claim 1, wherein said at least one set of colorants is made from primary or secondary colors.

4. The method according to claim 1, wherein said first device dependent colorant space corresponds with a printing device and said second device dependent colorant space corresponds with a proofing device.

5. The method according to claim 1, wherein said first device dependent colorant space corresponds with a first CMYK ink set and said second device dependent colorant space corresponds with a second CMYK ink set different from said first CMYK ink set.

6. The method according to claim 1, further including a step of converting an image represented in said first device dependent colorant space into an image represented in said second device dependent colorant space using said modified colorant set.

7. A method for modifying a table having input points and output points for transforming, by interpolation techniques, first colorants in a first device dependent colorant space into second colorants in a second device dependent colorant space, the method comprising the steps of:

selecting at least one input point in the table corresponding to a set of colorants in the first device dependent colorant space;

obtaining the output point of the table that corresponds with the input point, the output point representing a transformed set of colorants from the first device dependent colorant space into the second device dependent colorant space;

having the transformed set of colorants modified by a user to obtain a modified set of colorants;

automatically adjusting the transformed set of colorants so that the modified set of colorants retains at least one psychovisual or psychophysical quantity related to the transformed set of colorants; and replacing the output point of the table by the modified set of colorants to obtain a modified table.

8. The method according to claim 7, wherein the step of having the transformed set of colorants modified by a user includes eliminating at least one undesired colorant from the transformed set of colorants.

9. The method according to claim 7, wherein the set of colorants is made from primary or secondary colors.

10. The method according to claim 7, wherein the first device dependent colorant space corresponds with a printing device and the second device dependent colorant space corresponds with a proofing device.

11. The method according to claim 7, wherein the first device dependent colorant space corresponds with a first CMYK ink set and the second device dependent colorant space corresponds with a second CMYK ink set different from the first CMYK ink set.

12. The method according to claim 7, further including a step of converting an image represented in the first device dependent colorant space into an image represented in the second device dependent colorant space using the modified table.

* * * * *